Dec. 17, 1940.  J. W. WELSH  2,225,026
METHOD OF MAKING A TUBE OF CELLULOSE MATERIAL
Filed Feb. 15, 1938
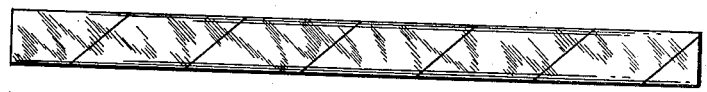
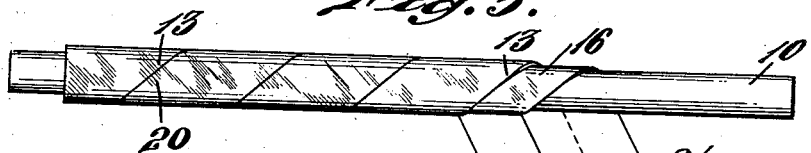
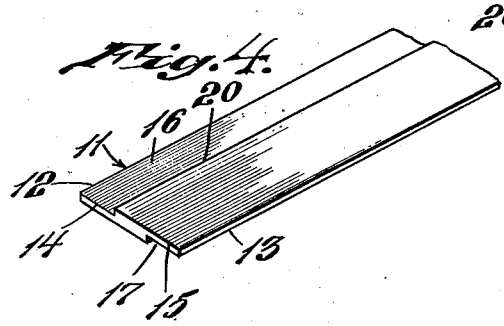
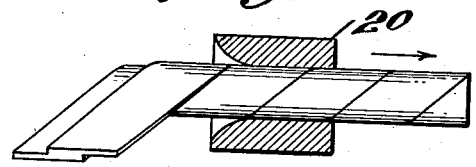
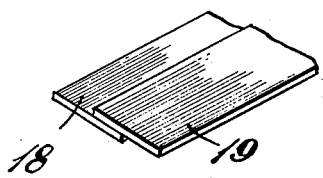
INVENTOR.
James W. Welsh
BY Barlow & Barlow
ATTORNEYS.

Patented Dec. 17, 1940

2,225,026

UNITED STATES PATENT OFFICE 2,225,026

METHOD OF MAKING A TUBE OF CELLULOSE MATERIAL

James W. Welsh, Providence, R. I., assignor to Welsh Manufacturing Company, a corporation of Rhode Island Application February 15, 1938, Serial No. 190,547

2 Claims. (Cl. 18—56)

This invention relates to the manufacture of a tube from some cellulose material, such as Celluloid or pyroxyline sheets or from other materials which may be made plastic and the softened parts welded together. An object of this invention is to provide a tube from sheet stock material with the stock disposed in a generally helical fashion with the edges of the strip which is so helically disposed more securely welded together than tubes which are now manufactured.

Another object of the invention is to shape the opposite edges of the helically disposed strip so that a more secure welding of the opposite edges of the helically wrapped strip may be had.

Another object of the invention is to provide a structure having right angular edges which may be firmly abutted by pressure and yet so shaped as to provide overlapping portions.

Another object of the invention is the utilization of two separate pieces of material which may be positioned together and wound into tubular form to provide two plies of material with the two plies so arranged that one ply overlaps the joint of the other ply to mutually strengthen each other and strengthen the entire structure.

Another object of the invention is the provision of two plies of material wound together and welded whereby a more expensive outer ply of material may be veneered upon a less expensive inner ply that a reduced cost may be had.

With these and other objects in view, the invention consists of certain novel features of construction, as will be more fully described, and particularly pointed out in the appended claims.

In the accompanying drawing:

Fig. 1 is an elevation of a tube formed in the manner of this invention;

Fig. 2 is a sectional view thereof;

Fig. 3 is an elevation showing the wrapping of the strip of material about an arbor;

Fig. 4 is a perspective view of the strip formed of a single piece of stock with its edges rolled into step formation;

Fig. 5 is a perspective view of the strip formed of two pieces of stock staggered to provide a strip with step formation edges;

Fig. 6 is a view showing the tube after formed and as being drawn through some suitable means for smoothing up its outer surface.

In the manufacture of tubing, it is known to helically wind a strip of material having the edge surfaces at right angles to the outer surface and then welding these edges together to provide a rigid tube. In this case the thickness of the material is the limit of area of the surfaces which may be welded together, and in order to provide a stronger tube and one presenting greater attaching surfaces, I have thinned the opposite edges of the strip that they may overlap while maintaining the opposite edges at right angles to the outer surface so that the extent of surface which is desired for attachment purposes at the joint of the helically disposed strip is dependent only on the width of the step or thinned portion at the edge of the strip, whereby a stronger joint may be formed; and in this connection I may utilize two strips in staggered relation that the outer may overlap the joint of the inner so that the surfaces welded together will present large areas for attachment one to the other and thus correspondingly strengthen the joint which is welded to provide a rigid tube; and the following is a more detailed description of the present embodiment of this invention, illustrating the preferred means by which these advantageous results may be accomplished.

With reference to the drawing, 10 designates an arbor about which a strip designated generally 11 may be helically wrapped. This strip 11 may be of a single thickness of material with its opposite margins adjacent its right angular edges 12 and 13 thinned as at 14 and 15 such as by rolling to provide step portions 16, 17, which step portions are of equal extent or width inwardly from the opposite edges 12 and 13 so that when the strip is helically wrapped about the arbor 10 the edges 12 and 13 will each abut the inner edge of the step 20, 21 also at right angles, while the step surfaces 16 and 17 will contact, as will be more readily apparent from Fig. 3, as the strip is helically disposed about the arbor 10. Some suitable softener, solvent or cement may be utilized for causing the edges 12, 20 and 13, 21 and the surfaces 16 and 17 to weld together or heat alone might be utilized for this purpose, while pressure may be applied such as by twisting the tube to force the edges together.

In some cases instead of forming a single strip in the step formation indicated I may utilize two plies of material one ply designated 18 and the other ply 19; these plies will each be of the same width but will be positioned one on the other in a somewhat staggered relation, such as shown in Fig. 5, so that one strip will project beyond the other and when cemented or welded together will provide in effect a strip of the step formation shown in Fig. 4 except that one ply will be a veneer on the other, in which case the outer ply may be of a more expensive material and thinner if desired than the inner ply, thus building up the required thickness of stock in the tube for strength purposes and yet utilizing the more expensive stock on the outside and a less expensive stock on the inside, cutting down the cost of material beyond the labor necessary for placing them together. A strip made up in this form is wound helically on arbor 10, as previously indicated. The two plies do not need to be attached before winding them on the arbor, but may be attached at the time of welding the overlapping and abutting edges of the helically disposed plies, as indicated in connection with Figs. 1 to 4.

In both cases after a helical strip is wound and welded the tube will be drawn through a dye 20, as shown in Fig. 6, or may be passed through a swedging machine or may be ground or in some manner treated to smooth up the joint formed at the edges 13 and 20 which because of the solvent or welding operation may not have been as smooth as desired.

By this arrangement a much more secure tube is provided by reason of the greater strength at the seams between the edges of the strip stock and yet one which may be readily formed by various helical wrapping machines known.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. The method of forming a tube which consists in forming a step in opposite surfaces of a strip of pyroxyline or like material at the opposite marginal edges thereof and then helically winding and fitting said edges so formed together and welding them to provide an amalgamated structure.

2. The method of forming a tube which consists in forming a step in opposite surfaces of a strip of pyroxyline or like material at the opposite marginal edges thereof and then helically winding and fitting said edges so formed together and welding them to provide an amalgamated structure, and smoothing the juncture of the abutting edges on the outer surface.

JAMES W. WELSH.